(12) United States Patent
Delaney et al.

(10) Patent No.: US 9,776,579 B1
(45) Date of Patent: Oct. 3, 2017

(54) HOOD AIR EXTRACTOR AND HOOD ASSEMBLY INCORPORATING SAME

(71) Applicant: FORD GLOBAL TECHNOLOGIES, LLC, Dearborn, MI (US)

(72) Inventors: Ryan Delaney, Ypsilanti, MI (US); Joseph Ovalles Quinones, Dearborn, MI (US); Thomas Joseph Ciccone, Madison Heights, MI (US); Joshua Walters, Shelby Township, MI (US); Andrew Thomas Cunningham, Royal Oak, MI (US); Peter Thai, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/278,943

(22) Filed: Sep. 28, 2016

(51) Int. Cl.
*B60R 13/07* (2006.01)
*B62D 25/12* (2006.01)
*B60K 11/08* (2006.01)

(52) U.S. Cl.
CPC .............. *B60R 13/07* (2013.01); *B60K 11/08* (2013.01); *B62D 25/12* (2013.01)

(58) Field of Classification Search
CPC ....... B60K 11/085; B60K 11/00; B60K 11/08; B60K 11/04; B60H 1/12
See application file for complete search history.

(56) References Cited

U.S. PATENT DOCUMENTS

| | | | |
|---|---|---|---|
| 4,850,444 A | | 7/1989 | Bojanowski et al. |
| 5,653,493 A | * | 8/1997 | Spears ................. B62D 35/001 296/180.2 |
| 5,950,753 A | | 9/1999 | Muldoon et al. |
| 7,559,391 B2 | * | 7/2009 | Bradley ............... B60K 11/085 180/68.1 |
| 8,936,128 B2 | | 1/2015 | Numa |
| 2003/0075950 A1 | * | 4/2003 | Rees .................... B62D 35/007 296/180.1 |
| 2006/0201727 A1 | | 9/2006 | Chan |
| 2013/0005232 A1 | | 1/2013 | Hoke et al. |

FOREIGN PATENT DOCUMENTS

| | | |
|---|---|---|
| DE | 202005021420 U1 | 12/2007 |
| DE | 102014101486 A1 | 8/2014 |
| EP | 2607130 B1 | 10/2014 |

OTHER PUBLICATIONS

English Machine Translation of DE102014101486A1.
English Machine Translation of DE202005021420U1.

* cited by examiner

*Primary Examiner* — John Walters
*Assistant Examiner* — James Triggs
(74) *Attorney, Agent, or Firm* — Jason Rogers; King & Schickli, PLLC

(57) ABSTRACT

A hood air extractor includes a support defining a first passageway. A first flap is carried on the support. The first flap is displaceable between a first position closing the first passageway to water passage in a first direction and a second position opening the first passageway to air passage in a second direction. A hood assembly incorporating one or more hood air extractors is also disclosed.

20 Claims, 6 Drawing Sheets

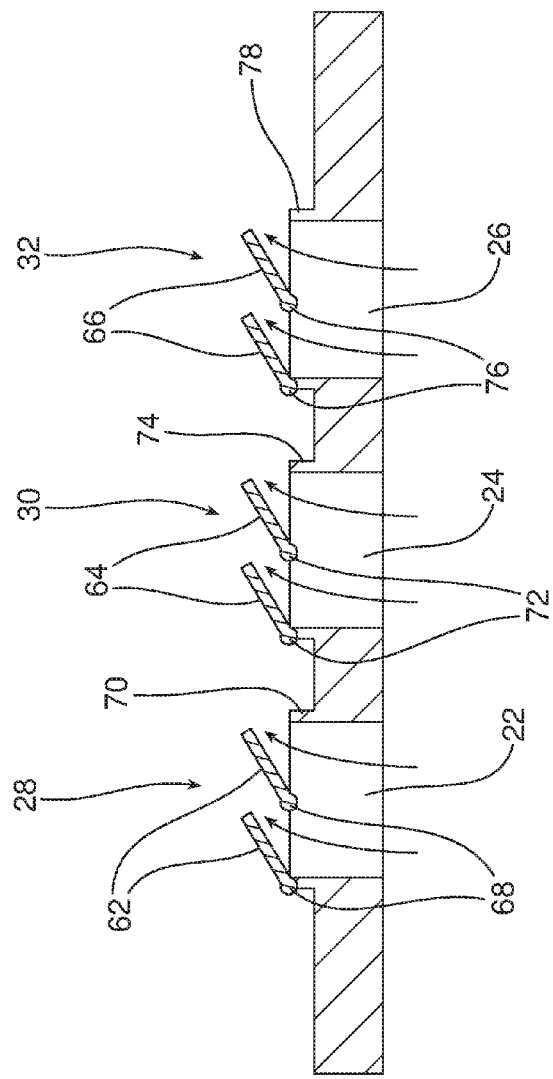

HOOD AIR EXTRACTOR AND HOOD ASSEMBLY INCORPORATING SAME

TECHNICAL FIELD

This document relates generally to the motor vehicle equipment field and, more particularly, to a hood air extractor and to a hood assembly incorporating such a hood air extractor.

BACKGROUND

High performance motor vehicles often require a hood vent for extracting air out from under the hood in order to relieve the buildup in air pressure at high vehicle speeds. Such a large vent opening in the hood overlying the engine creates water management issues. More specifically water must be channeled away from the engine. Toward this end removable rain trays have been developed to close off the hood vent during normal driving. Such a tray must be removed to open the hood vent and allow air extraction when high performance driving is anticipated such as on "track days."

This document relates to a new and improved hood air extractor that eliminates the need for a removable rain tray. Advantageously, the new hood air extractor provides the necessary water management to protect the engine from water while also allowing air extraction to relieve a high pressure air condition from under the hood as commonly associated with performance driving.

SUMMARY

In accordance with the purposes and benefits described herein, a hood air extractor is provided. That hood air extractor comprises a support defining a first passageway and a first flap carried on the support. The first flap is displaceable between a first position and a second position. In the first position the first flap closes the first passageway to prevent water passage in a first direction and thereby protect the engine from water. In the second position, the first flap opens the first passageway to allow air passage in a second direction thereby alleviating the buildup of high pressure air under the hood.

The first flap may include a first side and a second side. High pressure air impinges on the second side passively displacing the first flap from the first or closed position toward the second or opened position.

The support may include a first water drain channel. Further, the support may include a second water drain channel. The first passageway and the first flap may be positioned between the first water drain channel and the second water drain channel on the support.

The support may also define a second passageway. In addition, the support may include a second flap carried on the support. The second flap is displaceable between a third position and a fourth position. In the third position the second flap closes the second passageway to water passage in a first direction thereby protecting the engine from water. In the fourth position the second flap opens the second passageway to air passage in a second direction thereby allowing the relief of high pressure air from under the hood.

The support may further define a third passageway. Further, a third flap may be carried on the support. The third flap may be displaceable between a fifth position and a sixth position. In the fifth position, the third flap closes the third passageway to water passage in the first direction thereby protecting the engine from water. In the sixth position the third flap opens the third passageway to the passage of air in a second direction thereby allowing the relief of high pressure air from under the hood.

In accordance with an additional aspect, a hood assembly is provided for a motor vehicle. The hood assembly comprises a hood body including an air extractor opening. A hood air extractor is received in the air extractor opening. The hood air extractor includes (a) a support defining a first passageway and (b) a first flap carried on the support. The first flap is displaceable between a first or closed position and a second or opened position. In the first position, the first flap closes the first passageway to water passage in a first direction thereby preventing water from reaching the engine under the hood. In the second position, the first flap opens the first passageway to allow the passage of air in a second direction thereby relieving the buildup of high pressure air from under the hood during high speed driving.

The first flap includes a first side and a second side. High pressure air may impinge on the second side passively displacing the first flap toward the second or open position.

The support may include a first water drain channel. Further, the support may include a second water drain channel. The first passageway and the first flap may be positioned between the first water drain channel and the second water drain channel.

The support may define a second passageway. A second flap may be carried on the support. The second flap may be displaceable between a third position and a fourth position. In the third position, the second flap closes the second passageway to prevent the passage of water in a first direction thereby protecting the engine. In the fourth position, the second flap opens the second passageway to allow air passage in a second direction and the relief of high pressure air from under the hood.

Still further, the support of the hood assembly may define a third passageway. The hood assembly may also include a third flap carried on the support. The third flap may be displaceable between a fifth position and a sixth position. In the fifth position, the third flap closes the third passageway to prevent the passage of water in a first direction and thereby protect the engine from water. In the sixth position the third flap opens the third passageway to allow the passage of air in a second direction thereby relieving high pressure air from under the hood.

The hood assembly may further include a first raised rib extending around the first passageway. Further, the first flap may comprise a pair of vanes mounted by a pair of pivots to the first raised rib. A stop carried on the raised rib limits the first flap to open in a single direction.

Still further, the hood assembly may include a second raised rib extending around the second passageway and a third raised rib extending around the third passageway. The second flap may comprise a second pair of vanes mounted by a second pair of pivots to the second raised rib. The third flap may comprise a third pair of vanes mounted by a third pair of pivots to the third raised rib.

In the following description, there are shown and described several preferred embodiments of the hood air extractor and of the hood assembly incorporating the hood air extractor. As it should be realized, the hood air extractor and the hood assembly are capable of other, different embodiments and their several details are capable of modification in various, obvious aspects all without departing from the hood air extractor and hood assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hood air extractor and the hood assembly and together with the description serve to explain certain principles thereof. In the drawing figures:

FIG. 6 is a cross sectional view of an alternative embodiment wherein each flap comprises two vanes.

Reference will now be made in detail to the present preferred embodiments of the hood air extractor and hood assembly, examples of which are illustrated in the accompanying drawing figures.

DETAILED DESCRIPTION

Figure 1:
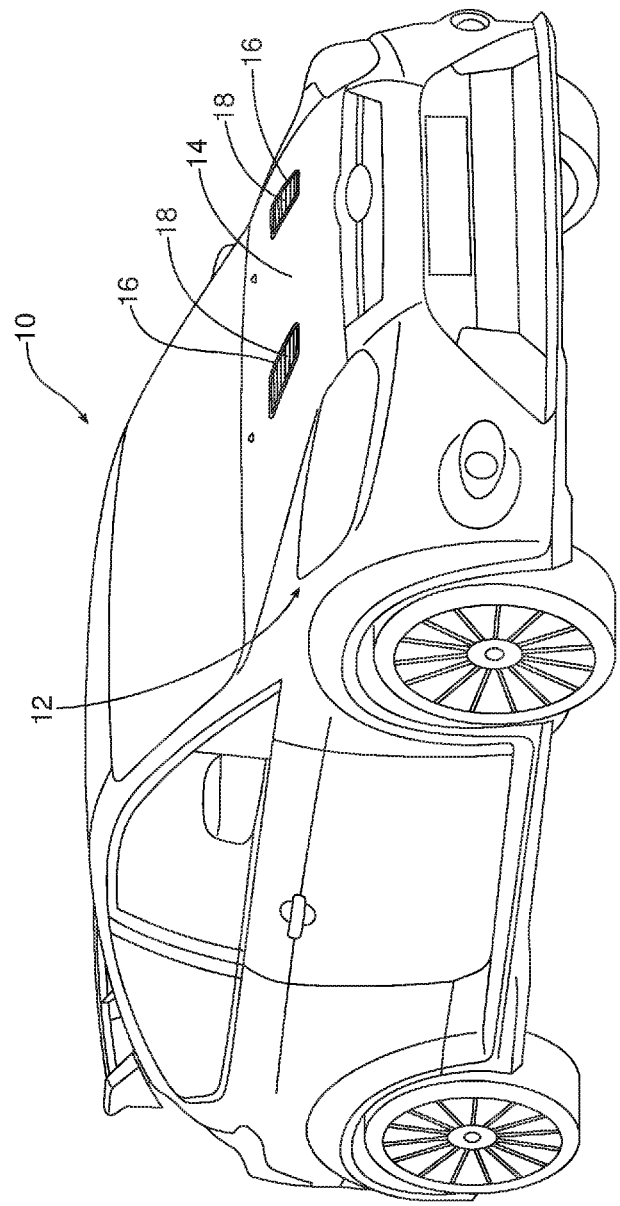
FIG. 1 is a perspective view of a motor vehicle incorporating a hood assembly including two hood vents with each hood vent holding a hood air extractor.
Figure 2:
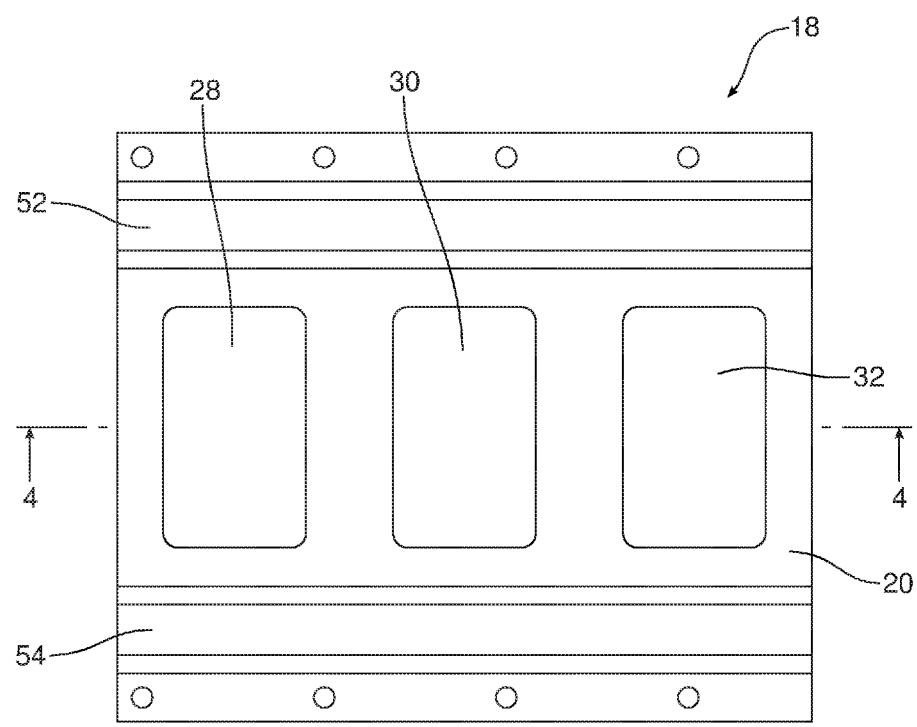
FIG. 2 is a detailed top plan view of a hood air extractor with flaps in the closed position closing the passageway in the hood air extractor support and thereby preventing the passage of water through the hood vent to the engine of the motor vehicle.
Figure 3:
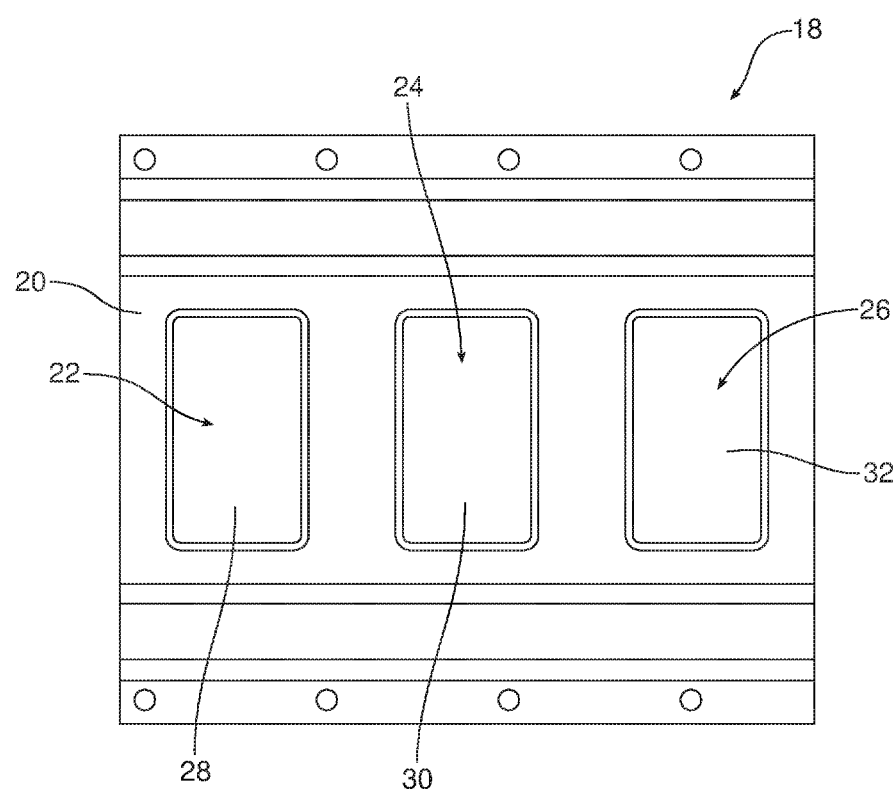
FIG. 3 is a detailed bottom plan view of the hood air extractor illustrated in FIG. 2 with the flaps remaining in the closed position.
Figure 4:
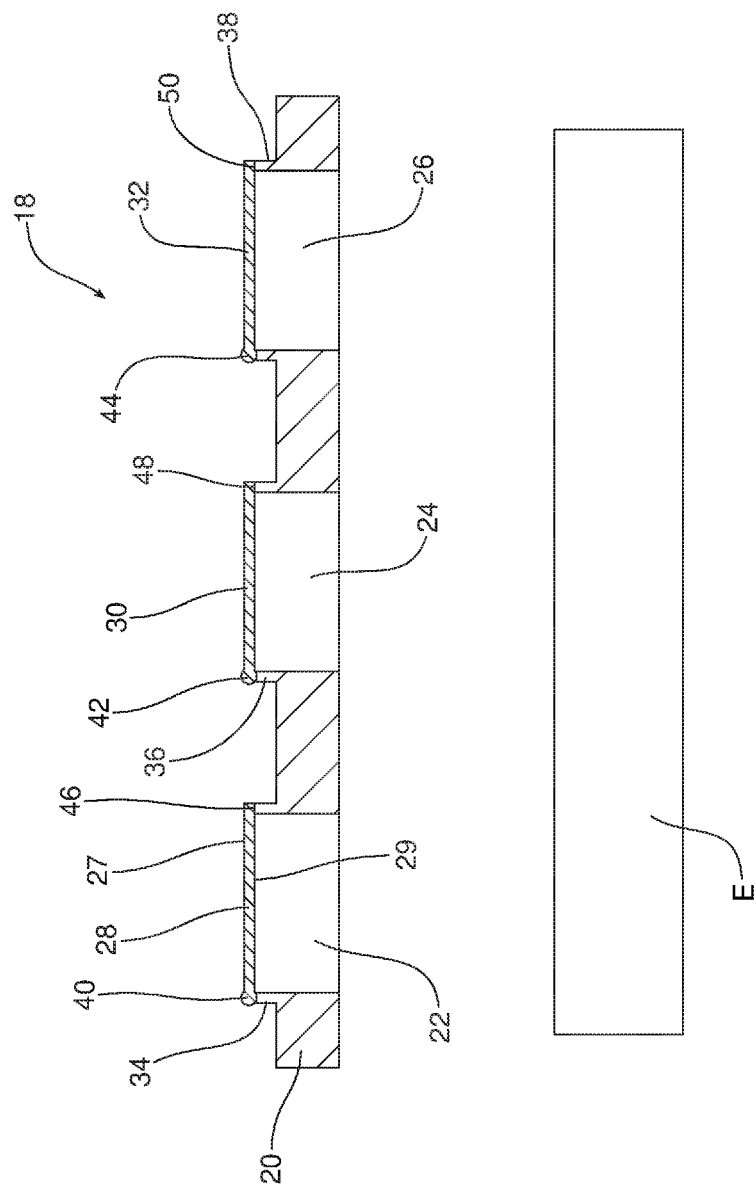
FIG. 4 is a schematic cross sectional view of the hood air extractor illustrated in FIGS. 2 and 3 with the flaps closed.
Figure 5:
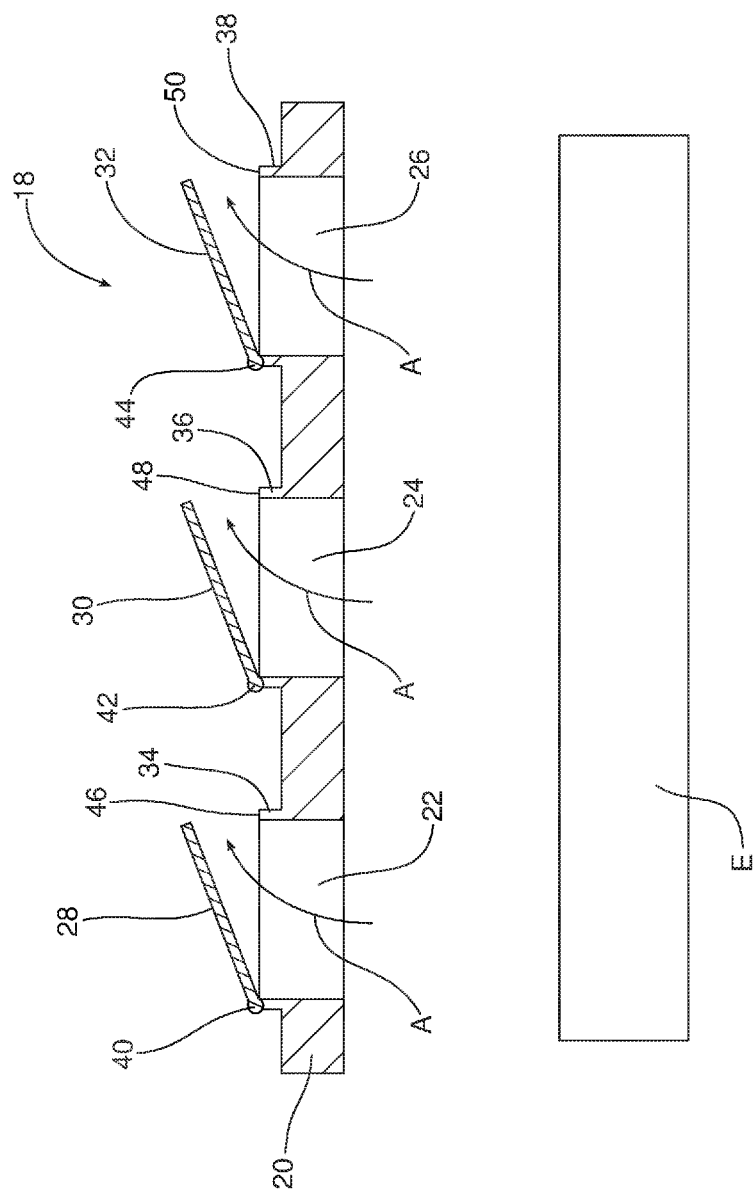
FIG. 5 is a cross sectional view similar to FIG. 4 but illustrating the flaps in the open position allowing the passage of air in a second direction for the relief of high pressure air from underneath the hood body.

Reference is now made to FIG. 1 illustrating a high performance motor vehicle 10 equipped with a hood assembly 12 having a hood body 14 with two hood vents 16 and two hood air extractors 18 received in those hood vents.

Reference is now made to FIGS. 2-5 illustrating one hood air extractor 18 in detail. As illustrated, the hood air extractor 18 includes a support 20. As should be appreciated, the support 20 is configured or shaped to close one of the hood vents 16 in the hood assembly 12.

In the illustrated embodiment, the support 20 includes a first passageway 22, a second passageway 24 and a third passageway 26. A first flap 28 is associated with the first passageway 22, a second flap 30 is associated with the second passageway 24 and a third flap 32 is associated with the third passageway 26. A first raised rib 34 is provided on the support 20 and extends around the first passageway 22. A second raised rib 36 is provided on the support 20 and extends around the second passageway 24. A third raised rib 38 is provided on the support 20 and extends around the third passageway 26.

In the embodiment illustrated in FIGS. 2-5, the first flap 28 includes a first or upper side 27 and a second or lower side 29. The first flap 28 is mounted by means of a first pivot 40 to the first raised rib 34. Similarly, the second flap 30 is connected by means of a second pivot 42 to the second raised rib 36. Further, the third flap 32 is connected by a third pivot 44 to the third raised rib 38. Under normal operating or driving conditions, the weight of the first flap 28 causes the first flap to pivot into a first position in engagement with the first stop 46, closing the first passageway 22 to water passage in a first or downward direction toward the motor vehicle engine E positioned under the hood body 14 (See FIGS. 2-4).

In contrast, during high speed operation of the motor vehicle 10, the air pressure under the hood body 14 builds. That high pressure air under the hood body 14 impinges on the second or lower side 29 of the first flap 28 displacing the first flap toward a second position, opening the first passageway 22 to air passage in a second or upward direction and thereby allowing high pressure air to be exhausted from underneath the hood body 14 (see FIG. 5).

The second flap 30 and third flap 32 operate in the same manner. Thus, during normal or low speed motor vehicle operation, the weight of the second flap 30 causes the second flap to assume a third position against the second stop 48, closing the second passageway 24 and preventing water passage in the first or downward direction through the hood body 14 to the underlying motor vehicle engine E. However, during high speed operation, air pressure under the hood body 14 impinges against the second or lower face of the second flap 30. Upon reaching a sufficient pressure, the second flap 30 is displaced toward a fourth position (illustrated in FIG. 5) opening the second passageway 24 to allow the passage of air in the second or upward direction. This exhausting of air releases air pressure from under the hood body 14 (note action arrows A).

In a similar manner, during normal or low speed vehicle operation, the weight of the third flap 32 causes the third flap to pivot into a fifth position against the third stop 50, closing the third passageway 26 to the passage of water in a first or downward direction from above the hood body 14 to the motor vehicle engine E. (See FIGS. 2-4.) In contrast, once the motor vehicle 10 exceeds a particular speed, air pressure builds sufficiently under the hood body 14 to passively displace the third flap 32 into a sixth position, opening the third passageway 26 to the passage of air in a second or upward direction. This exhausting of air through the third passageway relieves air pressure buildup under the hood body 14.

As noted above, during low speed operation of the motor vehicle 10 or when the motor vehicle is standing still, the weight of the first, second and third flaps 28, 30, 32 causes those flaps to close the respective first, second and third passageways 22, 24, 26. As a consequence, rain or other water is held on the first or upper face of the first, second and third flaps 28, 30, 32 and drains off of that surface onto the support 20. Here it should be appreciated that the support 20 may include one or more water drain channels 52, 54 to receive the water from the closed flaps 28, 30, 32 and direct that water by means of a water management conduit away from the motor vehicle engine E. In the illustrated embodiment, the first passageway 22, the second passageway 24 and the third passageway 26 are all aligned and positioned between a first water drain channel 52 on one side of the support 20 and a second water drain channel 54 on the other side of the support 20 which drain into a water management channel or other appropriate feature (not shown) which directs water away from the motor vehicle engine E.

In summary, numerous benefits are provided by the hood air extractor 18 and hood assembly 12 described in this document. The hood air extractor 18 and hood assembly 12 effectively manage water during normal motor vehicle operation by preventing that water from passing through the hood vents 16 to the underlying motor vehicle engine E. At the same time, when the motor vehicle 10 is operated in a high performance manner, sufficient air pressure builds up under the hood body 14 to open the first, second and third flaps 28, 30, 32 and allow the release or exhaust of under hood air pressure through the first, second and third passageways 22, 24, 26. Thus, hood air extraction is provided by the hood air extractors 18 and there is no need to remove the extractors from the hood vents as with prior art air extractor tray designs. As such, the hood air extractor 18 and hood assembly 12 are very user friendly with enhanced adaptability and versatility not found in prior art hood air extractor designs incorporating fixed vanes.

The foregoing has been presented for purposes of illustration and description. It is not intended to be exhaustive or to limit the embodiments to the precise form disclosed. Obvious modifications and variations are possible in light of the above teachings. For example, the shape of the passageways 22, 24, 26 and the associated flaps 28, 30, 32 may also be altered. Further, while the illustrated embodiments of the hood air extractor 18 incorporate three passageways 22, 24, 26 fewer or more passageways may be provided. Similarly, while the first, second and third flaps 28, 30, 32 of the illustrated embodiment all incorporate a single vane, substantially any other number of vanes may be provided. For example, FIG. 6 illustrates an alternative embodiment wherein the first flap 28 comprises two vanes 62, the second flap 30 comprises two vanes 64 and the third flap 32 comprises two vanes 66.

As further illustrated, the vanes 62 may be mounted by a first pair of pivots 68 to the first raised rib 70 surrounding the first passageway 22. The vanes 64 may be mounted by a second pair of pivots 72 to the second raised rib 74 surrounding the second passageway 24. Similarly, the vanes 66 may be mounted by a third pair of pivots 76 to the third raised rib 78 surrounding the third passageway 26. All such modifications and variations are within the scope of the appended claims when interpreted in accordance with the breadth to which they are fairly, legally and equitably entitled.

What is claimed is:

1. A hood air extractor, comprising:
   a support defining a first passageway; and
   a first flap carried on said support, said first flap being displaceable between (a) a first position closing said first passageway to water passage in a first direction and (b) a second position opening said first passageway to air passage in a second direction, wherein air impinges on a lower side of said first flap during high speed operation displacing said first flap toward the second position.

2. The hood air extractor of claim 1, wherein said support includes a first water drain channel.

3. The hood air extractor of claim 2, wherein said support includes a second water drain channel.

4. The hood air extractor of claim 3, wherein said first passageway and said first flap are positioned between said first water drain channel and said second water drain channel.

5. The hood air extractor of claim 4, wherein said support defines a second passageway.

6. The hood air extractor of claim 5, further including a second flap carried on said support, said second flap being displaceable between (a) a third position closing said second passageway to said water passage in said first direction and (b) a fourth position opening said second passageway to said air passage in said second direction.

7. The hood air extractor of claim 6, wherein said support defines a third passageway.

8. The hood air extractor of claim 7, further including a third flap carried on said support, said third flap being displaceable between (a) a fifth position closing said third passageway to said water passage in said first direction and (b) a sixth position opening said third passageway to said air passage in said second direction.

9. A hood assembly for a motor vehicle, comprising:
   a hood body including an air extractor opening; and
   a hood air extractor received in said air extractor opening, said hood air extractor including (a) a support defining a first passageway and (b) a first flap carried on said support, said first flap being displaceable between (i) a first position closing said first passageway to water passage in a first direction and (ii) a second position opening said first passageway to air passage in a second direction, wherein pressure air impinges on a lower side of said first flap during high speed operation displacing said first flap toward the second position.

10. The hood assembly of claim 9, wherein said support includes a first water drain channel.

11. The hood assembly of claim 10, wherein said support includes a second water drain channel.

12. The hood assembly of claim 11, wherein said first passageway and said first flap are positioned between said first water drain channel and said second water drain channel.

13. The hood assembly of claim 9, further including a first raised rib extending around said first passageway.

14. The hood assembly of claim 13, wherein said support defines a second passageway.

15. The hood assembly of claim 14, further including a second flap carried on said support, said second flap being displaceable between (i) a third position closing said second passageway to said water passage in said first direction and (ii) a fourth position opening said second passageway to said air passage in said second direction.

16. The hood assembly of claim 15, wherein said support defines a third passageway and wherein said hood assembly further includes a third flap carried on said support, said third flap being displaceable between (i) a fifth position closing said third passageway to said water passage on said first direction and (ii) a sixth position opening said third passageway to air passage in said second direction.

17. A hood assembly for a motor vehicle, comprising:
   a hood body including an air extractor opening; and
   a hood air extractor received in said air extractor opening, said hood air extractor including (a) a support defining a first passageway, (b) a first raised rib extending around said first passageway, and (c) a first flap carried on said support, said first flap being displaceable between (i) a first position closing said first passageway to water passage in a first direction and (ii) a second position opening said first passageway to air passage in a second direction, wherein said first flap comprises a pair of vanes mounted by a pair of pivots to said first raised rib.

18. The hood assembly of claim 17, further including a second raised rib extending around a second passageway defined by said support and a third raised rib extending around a third passageway defined by said support, wherein a second flap comprises a second pair of vanes mounted by a second pair of pivots to said second raised rib and a third flap comprises a third pair of vanes mounted by a third pair of pivots to said third raised rib.

19. The hood assembly of claim 17, wherein said support includes at least one water drain channel.

20. The hood assembly of claim 19, wherein said at least one water drain channel includes first and second water drain channels and said first passageway and said first flap are positioned between said first water drain channel and said second water drain channel.

\* \* \* \* \*